(12) United States Patent
Ahn

(10) Patent No.: US 11,780,418 B2
(45) Date of Patent: Oct. 10, 2023

(54) ELECTRO-HYDRAULIC BRAKING SYSTEM

(71) Applicant: HYUNDAI MOBIS CO., LTD., Seoul (KR)

(72) Inventor: Sung Ki Ahn, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 178 days.

(21) Appl. No.: 17/116,820

(22) Filed: Dec. 9, 2020

(65) Prior Publication Data

US 2022/0144234 A1 May 12, 2022

(30) Foreign Application Priority Data

Nov. 10, 2020 (KR) .................. 10-2020-0149168

(51) Int. Cl.
| | | |
|---|---|---|
| *B60T 13/66* | (2006.01) | |
| *B60T 13/14* | (2006.01) | |
| *B60T 13/16* | (2006.01) | |
| *B60T 15/02* | (2006.01) | |
| *B60T 13/68* | (2006.01) | |
| *B60T 13/58* | (2006.01) | |

(52) U.S. Cl.
CPC .......... *B60T 13/662* (2013.01); *B60T 13/14* (2013.01); *B60T 13/16* (2013.01); *B60T 13/58* (2013.01); *B60T 13/686* (2013.01); *B60T 15/028* (2013.01); *B60T 2270/203* (2013.01); *B60T 2270/402* (2013.01)

(58) Field of Classification Search
CPC ........ B60T 13/662; B60T 13/14; B60T 13/16; B60T 2270/203; B60T 15/028; B60T 13/686; B60T 2270/402; B60T 13/58
See application file for complete search history.

(56) References Cited

U.S. PATENT DOCUMENTS

| | | | |
|---|---|---|---|
| 6,179,396 B1* | 1/2001 | Fukami .................. | B60T 7/12 |
| | | | 303/155 |
| 2013/0240303 A1* | 9/2013 | Kim .................... | B60T 1/065 |
| | | | 188/72.3 |
| 2020/0207320 A1* | 7/2020 | Plewnia ................ | B60T 13/58 |
| 2022/0234561 A1* | 7/2022 | Seol ..................... | B60T 8/4068 |

FOREIGN PATENT DOCUMENTS

| | | |
|---|---|---|
| CN | 110035937 A | 7/2019 |
| CN | 114435326 A | 5/2022 |
| DE | 102018010167 A1 | 7/2020 |
| JP | H06502602 A | 3/1994 |
| KR | 10-2013-0102687 A | 9/2013 |
| KR | 10-2016-0087271 A | 7/2016 |
| KR | 10-2020-0125569 A | 11/2020 |

OTHER PUBLICATIONS

Korean office action dated Jan. 14, 2022 issued in corresponding Korean Application 10-2020-0149168.
German office action dated Oct. 18, 2021 issued in corresponding German Application 102018010167.
Office Action dated May 31, 2023 in corresponding Chinese Patent Application No. 202011528943.3.

* cited by examiner

*Primary Examiner* — Pamela Rodriguez
(74) *Attorney, Agent, or Firm* — NovoTechIP International PLLC

(57) ABSTRACT

According to an embodiment of the present invention, provided is an electro-hydraulic braking system including an auxiliary braking system capable of performing a 2-channel compression/decompression control and a 1-channel decompression control.

10 Claims, 1 Drawing Sheet

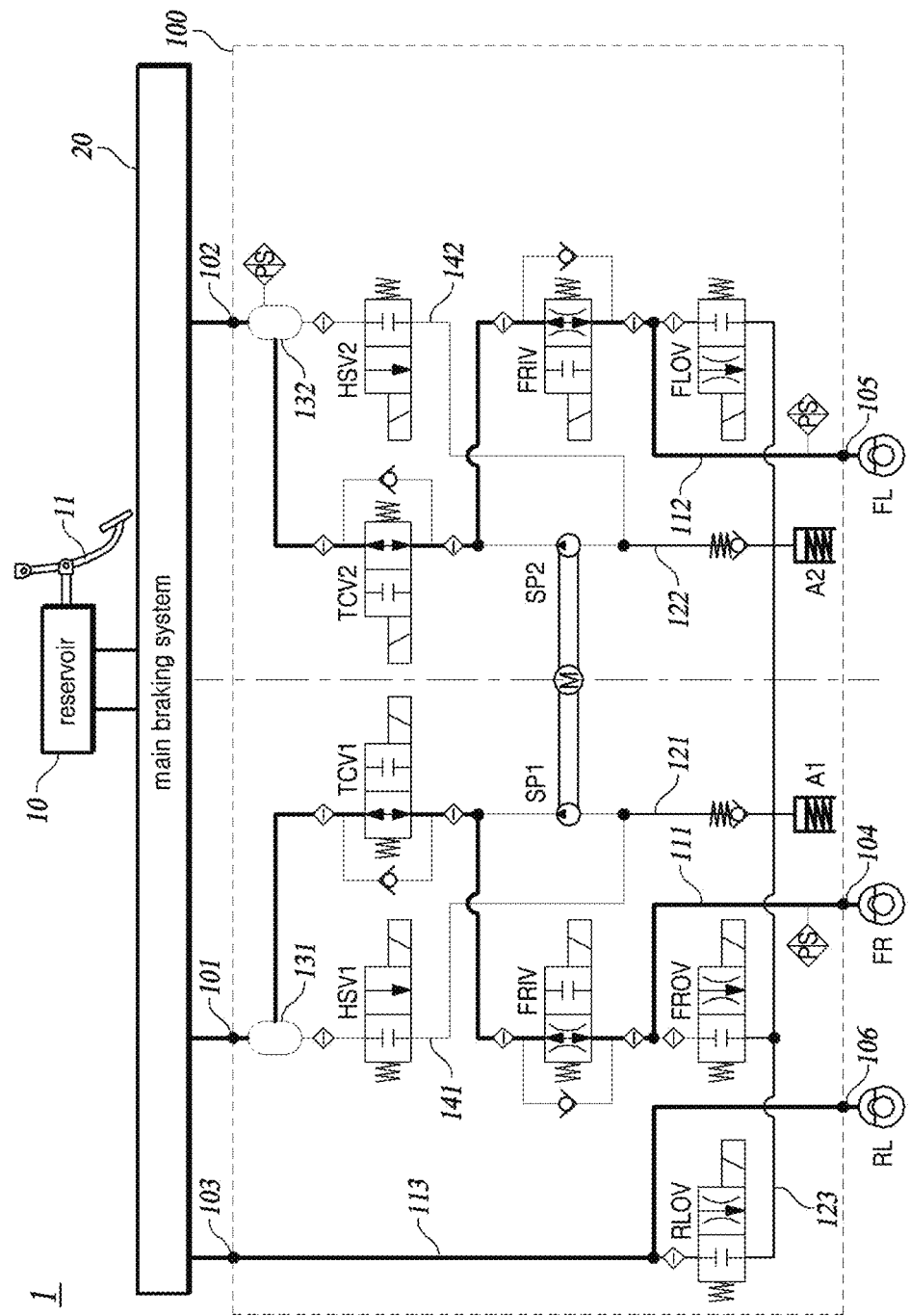

ELECTRO-HYDRAULIC BRAKING SYSTEM

BACKGROUND

1) Field

The present disclosure relates to an electro-hydraulic braking system.

2) Description of Related Art

The subject matter described in this section merely provides background information about the present disclosure and does not constitute prior art.

An autonomous driving vehicle ensures a fail-safe function by means of an auxiliary braking system disposed between a main braking system and a plurality of wheel brake apparatuses when a function abnormality occurs in a main braking system.

Meanwhile, a conventional auxiliary braking system performs a 2-channel compression/decompression control and a 2-channel decompression control. For example, a conventional auxiliary braking system performs a compression/decompression function for the front wheels and a decompression function for the rear wheels. To this end, a total of eight pipelines, including four input pipelines and four output pipelines, should be connected to the auxiliary braking system. As a result, there exist drawbacks in that the cost and weight of the brake system are increased, and in that the assembly in a manufacturing procedure is complicated.

SUMMARY

The present disclosure aims mainly to provide an electro-hydraulic braking system including an auxiliary braking system capable of performing a 2-channel compression and decompression control and a 1-channel decompression control.

The technical problems to be solved by the present invention are not limited to the above-mentioned problems, and other problems not mentioned can be clearly understood by those skilled in the art from the following description.

According to an embodiment of the present disclosure, an electrically powered hydraulic braking system may be provided, the electrically powered hydraulic braking system including: a reservoir for storing brake oil; a plurality of wheel brake apparatuses configured to provide a braking force to a plurality of wheels by providing hydraulic pressure; a main braking system disposed between the reservoir and the plurality of wheels brake apparatuses and configured to deliver brake oil discharged from the reservoir to the wheel brake apparatuses; and an auxiliary braking system disposed between the main braking system and the plurality of wheel brake apparatuses, wherein the auxiliary braking system includes: a first inlet line, a second inlet line, and a third inlet line which are configured to delivery hydraulic pressure between the main braking system and the wheel brake apparatuses; an actuating unit which is connected to a point on the first inlet line and a point on the second inlet line, is configured to increase the internal hydraulic pressure of the first outlet line and the internal hydraulic pressure of second inlet line, and includes a first pump and a second pump; a first outlet line which is branched from the first inlet line and connects a bifurcation of the first inlet line and the entrance of the first pump; the second outlet line which is branched from the second inlet line and connects a bifurcation of the second inlet line to the entrance of the second pump; and a third outlet line which is adapted to be opened and closed by an outlet valve, and is configured such that a point on the third inlet line is connected to at least one among the first outlet line and the second outlet line.

As described above, according to the present embodiment, an electro-hydraulic braking system includes an auxiliary braking system capable of performing a 2-channel compression/decompression control and a 1-channel decompression control, and thereby the manufacturing cost can be reduced and the assembly procedure can be more easily facilitated.

BRIEF DESCRIPTION OF THE DRAWINGS

FIG. 1 shows a hydraulic circuit of an electro-hydraulic braking system according to an embodiment of the present disclosure.

DETAILED DESCRIPTION

Some embodiments of the present disclosure will be described in detail below with reference to the exemplary drawings. It should be noted that, in adding reference numerals to the components in each figure, the same components have the same numerals as possible even if they are shown in different figures. In addition, in describing the present disclosure, a detailed description of a known related configuration or function can be omitted if such description is considered as making the gist of the present disclosure unclear.

In describing the components of the embodiments according to the present disclosure, terms and characters such as first, second, i), ii), a), b), and the like may be used. Such terms and characters are merely for distinguishing the component from other components, and the nature, the sequence, the order or the like of the component is not limited by the terms and characters. When something is said to "include" or "have" a certain component in the specification, it means that other components may further be included, rather than excluded, unless explicitly stated to the contrary.

In the present disclosure, with respect to the relative positions of lines, what is referred to as "forward" indicates a portion disposed at a closer distance from a reservoir 10 as brake oil flows, and what is referred to as "backward" indicates a portion disposed at a farther distance from the reservoir 10 as the brake oil flows. This, however, not only means that the line is directly continuous forwardly or backwardly, but also means a position is located at a relatively farther portion, even if spaced apart.

FIG. 1 is a hydraulic circuit diagram of an electro-hydraulic braking system according to an embodiment of the present disclosure. Meanwhile, a hydraulic circuit diagram shown in FIG. 1 is merely for showing each component conceptually for convenience of explanation, and it is should be noted that the actual positions of an actual hydraulic pressure block and lines formed inside the hydraulic pressure block may vary. Furthermore, in FIG. 1, an inlet line is indicated as a thick line, an outlet line is indicated as an intermediate line, and a circulation line is indicated as a thin line.

In addition, a reservoir 10, a brake pedal 11, and the specific components of a main braking system 20 in the present disclosure may be easily implemented by those skilled in the art, and thus specific illustrations and descriptions relating thereto are omitted.

Moreover, although the present disclosure shows the wheel brake apparatuses of which the hydraulic pressures are regulated by the auxiliary braking system 100 as being a front right wheel brake apparatus FR, a front left wheel brake apparatus FL, and a rear left wheel brake apparatus RL, this is merely an example. The wheel brake apparatuses may be any three of the front right wheel, the front left wheel, the rear right wheel, and the rear left wheel.

Referring to FIG. 1, the electro-hydraulic braking system 1 may include all or a part of a reservoir 10, a brake pedal 11, a main braking system 20, and an auxiliary braking system 100.

The reservoir 10 is configured to store brake oil therein.

The brake pedal 11 leads a translational motion of a piston (not shown) disposed inside a master cylinder (not shown) of the main braking system 20 as a response to the pedaling of a user.

The plurality of wheel brake apparatuses FR, FL, and RL apply a braking force on a plurality of wheels (not shown) by utilizing the hydraulic pressure of the brake oil discharged from the reservoir 10. When a driver pedals the brake pedal 11, an electric control unit (not shown) detects the driver's braking request by means of a pedal travel sensor (PTS, not shown). The electric control unit which detects the driver's braking request generates a braking signal. Here, the braking signal is an electrical signal which is delivered in order to cause the respective braking system 20, 100 to generate a corresponding braking force depending on the degree of pedaling of the driver on the brake pedal 11.

The main braking system 20 is disposed between the reservoir 10 and the plurality of wheel brake apparatuses FR, FL, and RL, and is configured to deliver the brake oil discharged from the reservoir 10 to the plurality of the wheel brake apparatuses FR, FL, and RL and to control the hydraulic pressure of the brake oil. When a fail occurs in at least some of the components of the main braking system 20, the electric control unit delivers an auxiliary braking signal to the auxiliary braking system 100. Once the auxiliary braking signal is delivered by the electric control unit to the auxiliary braking system 100, all or a part of the components of the auxiliary braking system 100 are actuated. The electro-hydraulic braking system 1 according to the present disclosure may, hereby, perform a fail-safe function.

The auxiliary braking system 100 is disposed between the main braking system 20 and the plurality of wheel brake apparatuses FR, FL and RL. In the event that an abnormality in the main braking system 20 occurs during an autonomous driving of a vehicle or in the event that an abnormality in the main braking system 20 occurs when the driver intervenes in direct braking, the auxiliary braking system 100 is actuated.

The auxiliary braking system 100 includes all or a part of hydraulic pressure input units 101, 102 and 103, hydraulic pressure output units 104, 105 and 106, inlet lines 111, 112 and 113, an actuating unit, traction control valves TCV1 and TCV2, inlet valves FRIV and FLIV, outlet lines 121, 122 and 123, outlet valves FROV, FLOV and RLOV, accumulators A1 and A2, oil chambers 131 and 132, circulation lines 141 and 142, and high pressure switching valves HSV1 and HSV2.

At least one of the hydraulic pressure input units 101, 102, and 103 is/are disposed on a line through which the brake oil discharged from the main braking system 20 flows to the auxiliary braking system 100. The hydraulic pressure input units 101, 102 and 103 allow the inlet lines 111, 112 and 113 to be in fluid communication with the main braking system 20. To this end, the hydraulic pressure input units 101, 102 and 103 are disposed at the boundary of the auxiliary braking system 100. The auxiliary braking system 100 according to the present disclosure includes a first inlet line 111, a second inlet line 112, and a third inlet line 113, and accordingly the auxiliary braking system 100 includes a first hydraulic pressure input unit 101, a second hydraulic pressure input unit 102, and a third hydraulic pressure input unit 103.

At least one of the hydraulic pressure output units 104, 105, and 106 is/are disposed on a line through which the brake oil discharged from the auxiliary braking system 100 flows to the plurality of wheel brake apparatuses FR, FL, and RL. The hydraulic pressure output units 104, 105 and 106 allow the inlet lines 111, 112, and 113 to be in fluid communication with the plurality of wheel brake apparatuses FR, FL, and RL. The auxiliary braking system 100 according to the present disclosure includes a first hydraulic pressure output unit 104, a second hydraulic pressure output unit 105, and a third hydraulic pressure output unit 106.

The inlet lines 111, 112, and 113 are formed between the hydraulic pressure input units 101, 102, and 103 and the hydraulic pressure output units 104, 105 and 106, and deliver the brake oil discharged from the main braking system 20 to the plurality of wheel brake apparatuses FR, FL, and RL. The inlet lines 111, 112, and 113 include a first inlet line 111, a second inlet line 112, and a third inlet line 113.

The first inlet line 111 is configured to deliver all or a part of the brake oil discharged from the main braking system 20 to a first wheel brake apparatus FR. Further, the second inlet line 112 is configured to deliver all or a part of the brake oil discharged from the main braking system 20 to the second wheel brake apparatus FL.

The hydraulic pressure of the fluid flowing inside the first inlet line 111 and the second inlet line 112 may be increased by an actuating unit. The actuating unit includes a motor which is configured to actuate a first pump SP1 and a second pump SP2, and pumps SP1 and SP2. The outlet portion of the first pump SP1 is connected to a point on the first inlet line 111. The outlet portion of the second pump SP2 is connected to a point on the second inlet line 112. When at least one of the first pump SP1 and the second pump SP2 is actuated, the internal hydraulic pressure of at least one of the inlet lines 111 and 112 connected to the respective pump SP1 and SP2 may increase.

A first traction control valve TCV1 is disposed at a point on the first inlet line 111, and opening and closing of the first inlet line 111 are regulated by the first traction control valve TCV1. Here, the first traction control valve TCV1 is disposed forward of the point where the first inlet line and the outlet portion of the first pump SP1 are connected. The first traction control valve TCV1 is formed as a normally open type. Therefore, in a non-powered mode where the auxiliary braking signal is not applied, the first traction control valve TCV1 is opened. When the first traction control valve TCV1 is closed, a portion of the brake oil compressed by the first pump SP1 may not flow backwardly to the main braking system 20.

A first inlet valve FRIV is disposed at another point on the first inlet line 111, and opening and closing of the first inlet line 111 are regulated by the first inlet valve FRIV. Meanwhile, the first inlet valve FRIV is disposed backward of the point where the first inlet line 111 and the outlet portion of the first pump SP1 are connected. The first inlet valve FRIV is formed as a normal open type. Therefore, in the non-powered mode where the auxiliary braking signal is not applied, the first inlet valve FRIV is opened. When the first inlet valve FRIV is closed, a portion of the brake oil compressed by the first pump SP1 is not delivered to the wheel brake apparatus FR. As a result, the pressure control of the brake oil is enabled.

The descriptions for the second inlet line 112, the second traction control valve TCV2, and the second inlet valve FLIV are replaced with the descriptions for the first inlet line 111, the first traction control valve TCV1, and the first inlet valve FRIV, respectively.

The third inlet line 113 is configured to deliver all or part of the brake oil discharged from the main braking system 20 to the third wheel brake apparatus RL. When the electric control unit applies an auxiliary braking signal, a line (not shown) connected to the third hydraulic pressure input unit 103 may be in a short circuit structure inside the main braking system 20. When the electric control unit delivers an auxiliary braking signal, the third inlet line 113 may be directly connected to the reservoir 10. As a result, when the driver intervenes in braking, the hydraulic pressure, which is increased by the pedaling of the brake pedal 11, may be directly delivered to the third wheel brake apparatus RL.

Meanwhile, the third inlet line 113 is not compressed by the actuating unit, and only the first inlet line 111 and the second inlet line 112 are compressed by the actuating unit. Accordingly, the auxiliary braking system 100 according to the present disclosure is capable of performing 2-channel compression control.

The outlet lines 121, 122, and 123 are connected to a point on the inlet lines 111, 112, and 113, so that at least some of the brake oil in the inlet line 111, 112, and 113 diverges.

The outlet lines 121, 122, and 123 include a first outlet line 121, a second outlet line 122, and a third outlet line 123.

One end of the first outlet line 121 is connected to a bifurcation on the first inlet line 111, the bifurcation being formed backward of the first inlet valve FRIV, and the other end is connected to the entrance portion of the first pump SP1.

A first outlet valve FROV is disposed at a point on the first outlet line 121, and opening and closing of the first outlet line 121 are regulated by the first outlet valve FROV. The first outlet valve FROV is formed as a normally close type. Thus, in the non-powered mode where the auxiliary braking signal is not applied, the first outlet valve FROV is closed. When the first outlet valve FROV is opened, at least some of the compressed brake oil flowing through the first inlet line 111 is discharged to the first outlet line 121. Thus, the hydraulic pressure delivered to the first wheel brake apparatus FR may be reduced.

A first accumulator A1 may be further disposed at another point on the first outlet line 121 formed backward of the first outlet valve FROV. The first accumulator A1 is configured to temporarily receive all or a part of the brake oil delivered from the first outlet line 121. Thus, a damage occurred in the first outlet line by the fluctuation of the brake oil may be minimized Here, what is said by the damage occurred in the first outlet line 121 includes, for example, a fatigue, a transformation, an abrasion, and the like, which are occurred in at least part of the line, when the line is exposed to a continuous fluctuation for a long period of time.

The descriptions for the second outlet line 122, the second outlet valve FLOV, and the second accumulator A2 are replaced by the descriptions for the first outlet line 121, the first outlet valve FROV, and the first accumulator A1, respectively.

Meanwhile, an electronic control unit (not shown) of the auxiliary braking system 100 according to the present disclosure determines whether to use the accumulators A1 and A2 depending on the required braking. For example, in the case of slow braking, only a part of each outlet valve FROV, FLOV and RLOV is opened, so that the brake oil flows only through the opened outlet lines 121, 122, and 123 and diverges from the inlet lines 111, 112, and 113. Here, since the amount of brake oil branched off is relatively small compared to the case of sudden braking, the brake oil is not received in the accumulators A1 and A2. However, in the case of sudden braking, all of the outlet valves FROV, FLOV and RLOV are opened, so that the brake oil flows through the entire outlet lines 121, 122, and 123 and diverges from the inlet lines 111, 112, and 113. Here, since the amount of brake oil branched off is relatively larger than the case of slow braking, the brake oil is received in the accumulators A1 and A2.

The third outlet line 123 is connected to a point on the third inlet line 113 at one end, and connected to the first outlet line 121 at the other end. In this case, the point at which the third outlet line 123 and the first outlet line 121 are connected is formed backward of the first outlet valve FROV. As a result, the brake oil delivered through the third outlet line 123 may join the brake oil flowing in the first outlet line 121.

The third outlet line 123 is connected to at least one of the first outlet line 121 and the second outlet line 122. As shown in the FIG. 1 of the present disclosure, for example, the first outlet line 121 and the second outlet line 122 may be connected and in fluid communication. In this case, the brake oil delivered through the third outlet line 123 may be received in at least one of the first accumulator A1 and the second accumulator A2. However, the present disclosure is not necessarily limited to this and the first outlet line 121 and the second outlet line 122 may not be connected. In this case, the brake oil delivered through the third outlet line 122 joins only to the first outlet line 121, and is received only in the first accumulator A1.

A third outlet valve RLOV is disposed at a point on the third outlet line 123, and opening and closing of the third outlet line 123 are regulated by the third outlet valve RLOV. The third outlet valve RLOV is formed as a normally close type. Thus, in the non-powered mode, the third outlet valve RLOV is closed. When the third outlet valve RLOV is opened, at least some of the compressed brake oil flowing through the third inlet line 113 diverges to the third outlet line 123. As a result, the hydraulic pressure delivered to the third wheel brake apparatus RL may be reduced.

In the auxiliary braking system 100 according to the present disclosure, the hydraulic pressures provided into the wheel brake apparatuses FR, FL, and RL are reduced as the outlet valves FROV, FLOV, and RLOV are opened. That is, the auxiliary braking system 100 may perform a 3-channel decompression control.

To summarize the above, the auxiliary braking system 100 according to an embodiment of the present disclosure does not participate in the control of compression/decompression in the wheel brake apparatus for the rear right wheel. That is, the auxiliary braking system 100 is capable of performing a 2-channel compression/decompression control and a 1-channel decompression control. Therefore, the auxiliary braking system 100 according to the present disclosure including the electro-hydraulic braking system 100, may include three lines connected to three hydraulic pressure input units 101, 102, and 103 and three lines connected to three hydraulic pressure output units 104, 105, and 106. While more than eight lines should be connected to the auxiliary braking system for 4-channel compression/decompression in the conventional auxiliary braking systems, the auxiliary braking system 100 according to the present disclosure enables an auxiliary braking function even if a total of six lines are connected thereto. Accordingly, the electro-hydraulic braking system 1 according to the present disclosure has an effect of cost reduction. Furthermore, during vehicle manufacturing, the piping work of the auxiliary braking system 100 is advantageously simplified, and the assembly of the vehicle is simplified.

A first oil chamber 131 may also be disposed on the first inlet line 111. In this case, the first oil chamber 131 is disposed in front of the first traction control valve TCV1. The first oil chamber 131 may temporarily receive at least part of the brake oil discharged from the main braking system 20 therein.

Each of the circulation lines 141 and 142 is connected to the oil chamber 131 and 134 at one end, and to the outlet line 121 and 122, adjacent to the entrance portions of the pumps SP1 and SP2, at the other end. Here, the position at which the other end of the circulation line 141 or 142 is connected to the outlet line 121 or 122 is preferably formed backward of the accumulator A1 or A2. As a result, the brake oil discharged from the accumulators A1 and A2 and the oil chambers 131 and 132 is supplied to the actuating unit, and thereby a sufficient amount of brake oil required for the actuating unit to be actuated may be provided.

The first high pressure switching valve HSV1 is disposed at a position on the first circulation line 141, and the opening and closing of the first circulating line 141 are regulated by the first high pressure switching valve HSV1. The first high pressure switching valve HSV1 is formed as a normally close type. Thus, in the non-powered mode, the first high pressure switching valve HSV1 is closed. When the first high pressure switching valve HSV1 is opened, at least some of the brake oil contained in the first oil chamber 131 is provided to the actuating unit.

The descriptions for the second high pressure switching valve HSV2 and the second circulation line 142 are replaced by the descriptions for the first high pressure switching valve HSV1 and the first circulation line 141.

When the hydraulic pressure supplied from the reservoir 10 is not sufficient when the auxiliary hydraulic signal is applied, at least a part of the brake oil contained in the oil chambers 131 and 132 may be supplied to the actuating unit. Therefore, in the case where the brake oil is supplied from the reservoir 10 and increased in pressure, the auxiliary braking system 100 according to the present disclosure may have a quick responsiveness.

The above description is merely illustrative of the technical idea of the present embodiment, and various modifications and variations will be apparent to those skilled in the art without departing from essential characteristics of the embodiment. Accordingly, the present embodiments are not intended to limit the technical idea of the present embodiment, but are to be described by way of examples, and the scope of the technical concept of the present embodiment is not limited by such embodiments. The protection scope of the present embodiment should be construed by the following claims, and all technical ideas that are within the scope of equivalents thereof should be interpreted as being included in the scope.

TERMINOLOGIES FOR REFERENCE NUMERALS

1: brake system
10: reservoir
11: brake pedal
20: main braking system
100: auxiliary braking system
111, 112, 113: inlet flow path
121, 122, 123: outlet flow path
131, 132: oil chamber
141, 142: circulation flow path
TCV: traction control valve
HSV: high-pressure switching valve
IN: inlet valve
OV: outlet valve
SP: pump

What is claimed is:

1. An electrically powered hydraulic braking system, comprising:
   a reservoir for storing brake oil;
   a plurality of wheel brake apparatuses configured to provide a braking force to a plurality of wheels by providing hydraulic pressure;
   a main braking system disposed between the reservoir and the plurality of wheel brake apparatuses and configured to deliver brake oil discharged from the reservoir to the wheel brake apparatuses; and
   an auxiliary braking system disposed between the main braking system and the plurality of wheel brake apparatuses,
   wherein the auxiliary braking system comprises:
      a first inlet line and a second inlet line which are configured to deliver hydraulic pressure between the main braking system and the plurality of wheel brake apparatuses;
      an actuating unit which is connected to a point on the first inlet line and a point on the second inlet line, is configured to increase the internal hydraulic pressure of the first inlet line and the internal hydraulic pressure of the second inlet line, and includes a first pump and a second pump;
      a first outlet line which is branched from the first inlet line and connects a bifurcation of the first inlet line to the entrance of the first pump; and
      a second outlet line which branched from the second inlet line and connects a bifurcation of the second inlet line to the entrance of the second pump,
      wherein the first and second outlet lines are directly connected to each other.

2. The electrically powered hydraulic braking system according to claim 1, wherein the auxiliary braking system further comprises:
   a first oil chamber disposed on the first inlet line forward of a connection point of the first inlet line and the actuating unit, and configured to receive brake oil therein; and
   a second oil chamber disposed on the second inlet line forward of a connection point of the second inlet line and the actuating unit, and configured to receive brake oil therein.

3. The electrically powered hydraulic braking system according to claim 2, wherein the auxiliary braking system further comprises:
   a first circulation line connecting the first oil chamber and the entrance of the first pump; and
   a second circulation line connecting the second oil chamber and the entrance of the second pump.

4. The electrically powered hydraulic braking system according to claim 1, wherein the auxiliary braking system further comprises:
   a first traction control valve disposed on the first inlet line and configured to adjust opening and closing of the first inlet line; and a second traction control valve disposed on the second inlet line and configured to adjust opening and closing of the second inlet line.

5. The electrically powered hydraulic braking system according to claim 1, wherein the auxiliary braking system further comprises:
a plurality of hydraulic pressure input units formed adjacent to the main braking system and connected to the inlet lines; and
a plurality of hydraulic pressure output units formed adjacent to the plurality of wheel brake apparatuses and connected to the inlet lines.

6. An electrically powered hydraulic braking system, comprising:
a reservoir for storing brake oil;
a plurality of wheel brake apparatuses configured to provide a braking force to a plurality of wheels by providing hydraulic pressure;
a main braking system disposed between the reservoir and the plurality of wheel brake apparatuses and configured to deliver brake oil discharged from the reservoir to the wheel brake apparatuses; and
an auxiliary braking system disposed between the main braking system and the plurality of wheel brake apparatuses,
wherein the auxiliary braking system comprises:
a first inlet line and a second inlet line which are configured to deliver hydraulic pressure between the main braking system and the plurality of wheel brake apparatuses;
an actuating unit which is connected to a point on the first inlet line and a point on the second inlet line, is configured to increase the internal hydraulic pressure of the first inlet line and the internal hydraulic pressure of the second inlet line, and includes a first pump and a second pump;
a first outlet line which is branched from the first inlet line and connects a bifurcation of the first inlet line to the entrance of the first pump; and
a second outlet line which branched from the second inlet line and connects a bifurcation of the second inlet line to the entrance of the second pump, and
wherein the auxiliary braking system further comprises:
a third inlet line configured to deliver hydraulic pressure between the main braking system and the plurality of wheel brake apparatuses; and
a third outlet line adapted to be opened and closed by an outlet valve and configured such that a point on the third inlet line is connected to at least one among the first outlet line and the second outlet line.

7. The electrically powered hydraulic braking system according to claim 6, wherein the auxiliary braking system further comprises:
a first outlet valve disposed in the first outlet line and configured to regulate opening and closing of the first outlet line;
a second outlet valve disposed in the second outlet line and configured to regulate opening and closing of the second outlet line; and
a third outlet valve disposed in the third outlet line and configured to regulate opening and closing of the third outlet line.

8. The electrically powered hydraulic braking system according to claim 7, wherein the auxiliary braking system further comprises:
a first accumulator configured to receive at least some of the brake oil discharged from the first outlet line; and
a second accumulator configured to receive at least some of the brake oil discharged from the second outlet line.

9. The electrically powered hydraulic braking system according to claim 8, wherein the auxiliary braking system is characterized in that at least one of the first accumulator and the second accumulator is configured to receive at least some of the brake oil discharged from the third outlet line.

10. An electrically powered hydraulic braking system, comprising:
a reservoir for storing brake oil;
a plurality of wheel brake apparatuses configured to provide a braking force to a plurality of wheels by providing hydraulic pressure;
a main braking system disposed between the reservoir and the plurality of wheel brake apparatuses and configured to deliver brake oil discharged from the reservoir to the wheel brake apparatuses; and
an auxiliary braking system disposed between the main braking system and the plurality of wheel brake apparatuses,
wherein the auxiliary braking system comprises:
a first inlet line and a second inlet line which are configured to deliver hydraulic pressure between the main braking system and the plurality of wheel brake apparatuses;
an actuating unit which is connected to a point on the first inlet line and a point on the second inlet line, is configured to increase the internal hydraulic pressure of the first inlet line and the internal hydraulic pressure of the second inlet line, and includes a first pump and a second pump;
a first outlet line which is branched from the first inlet line and connects a bifurcation of the first inlet line to the entrance of the first pump; and
a second outlet line which branched from the second inlet line and connects a bifurcation of the second inlet line to the entrance of the second pump,
wherein the auxiliary braking system further comprises:
a first traction control valve disposed on the first inlet line and configured to adjust opening and closing of the first inlet line; and
a second traction control valve disposed on the second inlet line and configured to adjust opening and closing of the second inlet line, and
wherein the auxiliary braking system further comprises:
a first inlet valve disposed between (1) a point on the first inlet line, which is formed backward of the first traction control valve and (2) a bifurcation with the first outlet line, and configured to regulate opening and closing of the first inlet line; and
a second inlet valve disposed between (1) a point on the second inlet line, which is formed backward of the second traction control valve and (2) a bifurcation with the second outlet line, and configured to regulate opening and closing of the second inlet line.

* * * * *